(12) United States Patent
Yoshioka

(10) Patent No.: US 7,281,474 B2
(45) Date of Patent: Oct. 16, 2007

(54) PRINTING METHOD FOR PRINTING OPTICALLY READABLE CODE ON PRINTING MEDIUM, USING PRINTING PLATE AND PRINTED MATTER BEARING PRINTED AND OPTICALLY READABLE CODE

(75) Inventor: Kenji Yoshioka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 937 days.

(21) Appl. No.: 09/998,221

(22) Filed: Nov. 15, 2001

(65) Prior Publication Data

US 2002/0080369 A1    Jun. 27, 2002

(30) Foreign Application Priority Data

Dec. 13, 2000   (JP) .............................. 2000-378986

(51) Int. Cl.
*B41F 1/34* (2006.01)

(52) U.S. Cl. ...................... 101/485; 101/177; 101/491

(58) Field of Classification Search .................. 101/91, 101/92, 174, 177, 181, 183, 217, 219, 483, 101/485, 491
See application file for complete search history.

(56) References Cited

U.S. PATENT DOCUMENTS

| 5,896,403 A | 4/1999 | Nagasaki et al. |
| 5,956,067 A * | 9/1999 | Isono et al. ................. 347/176 |
| 6,095,050 A * | 8/2000 | Figov ......................... 101/483 |

FOREIGN PATENT DOCUMENTS

JP    11-263062 A    9/1999

* cited by examiner

*Primary Examiner*—Ren Yan
(74) *Attorney, Agent, or Firm*—Frishauf, Holtz, Goodman & Chick, P.C.

(57) ABSTRACT

A dot code is printed on a sheet of paper by using a first printing plate and a first ink. Immediately thereafter, a code coat is formed by printing to cover the dot code, by using a second printing plate and a second ink having a property of not affecting the operation of reading the code.

5 Claims, 8 Drawing Sheets

PRINTING METHOD FOR PRINTING OPTICALLY READABLE CODE ON PRINTING MEDIUM, USING PRINTING PLATE AND PRINTED MATTER BEARING PRINTED AND OPTICALLY READABLE CODE

CROSS-REFERENCE TO RELATED APPLICATIONS

This application is based upon and claims the benefit of priority from the prior Japanese Patent Application No. 2000-378986, filed Dec. 13, 2000, the entire contents of which are incorporated herein by reference.

BACKGROUND OF THE INVENTION

1. Field of the Invention

This invention relates to a printing method for printing data as optically readable code on a printing medium by printing plates and also to a printed matter bearing such a printed code.

2. Description of the Related Art

Techniques for printing various data including those of sounds, images and other forms of information as optically readable code on a printing medium such as paper are known. U.S. Pat. No. 5,896,403 discloses such a technique.

FIG. 1 of the accompanying drawing schematically illustrates a dot code 101 printed on a printing medium, which is a sheet of paper. Referring to FIG. 1, the dot code 101 is formed by printing optically readable dots 103 that represent many "1s" or "0s" of binary data, the absence or presence of a dot correspondingly representing a "0" or "1". The original binary data is restored and, for instance, the original sound is reproduced by optically reading the dot code by a dedicated reading device. For such a dot code to operate properly, each dot of the dot code needs to have a predetermined size and be printed at the proper position. Since each dot is as small as about 30 to 120 µm, a highly sophisticated printing technology is required for printing such dots.

A feasible printing method for printing such dot codes is offset printing. Offset printing is popularly being used because it can print at low cost. However, offset printing is accompanied by a problem referred to as "offset doubling", which, if occurs, is fatal to dot codes.

This problem of offset doubling will be described in detail by referring to FIGS. 2 and 3 of the accompanying drawing.

FIG. 2 schematically illustrates a printed dot code that is an offset doubling. As an offset doubling is produced in a printing operation, a shadowy dot 107 appears for each of the dots 105 that are proper dots at a position separated by distance d from the proper dot. The shadowy dots 107 are normally formed behind the respective dots as viewed in the printing direction with a density lower than that of the proper dots.

FIG. 3 schematically illustrates how an offset doubling is produced. A color printing machine normally comprises a plurality of printing units, of which only two (a preceding printing unit 200 and a succeeding printing unit 210) are shown in FIG. 3 for the purpose of simplification. The preceding printing unit 200 comprises a blanket cylinder 201, an impression cylinder 202 and a plate cylinder 203. Similarly, the succeeding printing unit 210 comprises a blanket cylinder 211, an impression cylinder 212 and a plate cylinder 213. Dots 105 are printed as a sheet of paper 300 is forced to pass between the blanket cylinder 201 and the impression cylinder 202 of the preceding printing unit 200.

Then, the sheet of paper 300 where the dots 105 are printed by the preceding printing unit 200 is then forced to pass through the blanket cylinder 211 and the impression cylinder 212 of the succeeding printing unit 210 and a readable image other than the dots 105 is printed on the sheet of paper 300 with ink of a color other than the color of the dots 105.

The dots 105 printed by the preceding printing unit 200 are proper dots. On the other hand, the dots 107 of the offset doubling are printed as part of the ink used for printing the dots 105 by the preceding printing unit 200 is reversely trapped by the blanket cylinder 211 of the succeeding printing unit 210 as so many dots 220 on the blanket cylinder 211 and then transferred onto the sheet of paper 300 immediately following the former sheet of paper 300 at positions displaced from the positions of the respective corresponding proper dots 105 by a distance of d on the sheet of paper 300 immediately following the former sheet of paper 300.

In the case of a color printing machine comprising a plurality of printing units, such a reverse trap occurs partly because the sheet of paper 300 is moved from one printing unit to the next before the ink transferred onto the sheet of paper 300 by the former printing unit dries. It will be appreciated that the problem of offset doubling apparently does not occur if the reversely trapped ink of the dots is not displaced. However, if the printing units are serviced and regulated properly, offset doublings can occur because sheets of paper can expand or shrink and the rate at which they are moved can vary, if only slightly.

In order to eliminate offset doublings, efforts are being made to prevent ink from being reversely trapped by the succeeding printing units by checking the printing units for backlash, regulating the tension, the blanket and the rate of feeding ink and water and so on. However, it is hardly possible to completely eliminate offset doublings.

FIG. 4 of the accompanying drawing schematically illustrates the density distribution of the offset doubling of FIG. 2 as viewed in cross section taken along line A-A' in FIG. 2.

Referring to FIG. 4, the properly printed dots 105 show the predetermined density. On the other hand, the shadowy dots 107 of the offset doubling show a low density because the amount of ink used for producing each of the shadowy dots 107 is smaller than the amount of ink used for producing the corresponding proper dot 105. However, as the offset doubling occurs, each of the proper dots comes to appear as an oblong dot, which the reading device cannot read correctly. As a result the original data recorded in the form of dot code cannot be reproduced.

Therefore, elimination of offset doublings is a priority problem for printing dot codes by offset printing.

Jpn. Pat. Appln. KOKAI Publication No. 11-263062 proposes a printing method for removing the problem of offset doublings. Now, the proposed printing method will be discussed by referring to FIGS. 5 through 7 of the accompanying drawings.

Referring firstly to FIG. 5, assume that the image to be produced by printing includes (1) continuous gradation (black (hereinafter referred to as "K"), cyan (hereinafter referred to as "C"), magenta (hereinafter referred to as "M") and yellow (hereinafter referred to as "Y")), (2) characters/lines (K) and (3) data codes (K). At the time of color separation for preparing plates, two groups of plates including the first group of a first black K1 plate for (1) gradation and (2) characters/lines, a C plate, an M plate and a Y plate and the second group of only a second black K2 plate for (3) data codes are formed. In other words, two separate plates including the K1 plate for gradation and characters/lines and the K2 plate for data codes are used for black (K) printing.

Then, as shown in FIG. 6, the printing operation is conducted by sequentially using the K1 plates, the C plate, the M plate, the Y plate and the K2 plate in the mentioned order. In other words, the cylinder (printing unit) of the K2 plate is used to complete the printing operation in order to eliminate any offset doublings as no printing unit comes after the printing unit of the K2 plate.

FIG. 7 illustrates a method obtained by modifying the above described method. Referring to FIG. 7, the printing operation using the cylinder of the K2 plate for data codes is conducted first and then the K1 plates, the C plate, the M plate, the Y plate are used sequentially after drying the ink used with the K2 plate to realize a similar effect.

Meanwhile, information recording media typically bearing dot codes 101 have been required to be visually appealing in recent years. For instance, bar codes printed in black on a white background have become increasingly unpopular because they are not visually appealing, although they are widely being used currently. The white background may typically be replaced by a yellow background.

However, the printing method disclosed in the above cited Jpn. Pat. Appln. KOKAI Publication No. 11-263062 has disadvantages for multi-color printing when it is used to make printed matters appealing.

For example, assume that a yellow background is used for a black dot code in a printing operation that is conducted by following the sequence shown in FIG. 6. Then, Y ink has to be used in Step SS24 to produce a yellow background that is much larger than the area to be used for printing the dot code in the immediately succeeding step of SS25 using the K2 plate. However, with the listed sequence, there arose a problem that the dots of the dot code were not produced properly nor read correctly by the reading device. As a result of a painstaking investigation, it was found that the problem occurred because the black ink used for the K2 plate was not easily transferred onto the sheet of paper because the Y ink used immediately before for printing the background over the large area had not dried sufficiently. Thus, with the above described printing method, only the inherent color of the sheet of paper can be used for the background of the dot code. Therefore, this method cannot meet the increasing demand for visually appealing dot codes.

On the other hand, while it is possible to print yellow on the dot code with the method of FIG. 7 shown there in the sequence of the printing operation, the dot code needs to be printed and dried in advance. In other words, a sheet of paper needs to be forced pass through a printing machine twice. Therefore, this method is costly and hence not practical.

BRIEF SUMMARY OF THE INVENTION

In view of the above identified circumstances, it is therefore the object of the present invention to provide a printing method and a printed matter that do not give rise to any offset doublings and can be used effectively and efficiently to meet the demand for multi-color printing at reduced cost.

According to an aspect of the present invention, there is provided a printing method for printing an optically readable dot code on a printing medium by means of printing plates, the method comprising:

a first step of printing the code on the printing medium, using a first printing plate and a first ink; and a second step of forming a code coat covering the code on the printing medium by printing, using a second printing plate and a second ink having a property of not affecting the operation of reading the code.

According to another aspect of the present invention, there is provided a printed matter bearing an optically readable printed code, the printed matter comprising:

the code printed by using a first printing plate and a first ink; and a code coat formed by printing to cover the code immediately after the operation of printing the code, using a second printing plate and a second ink having a property of not adversely affecting the operation of reading the code, the second printing plate and the second ink being different respectively from the first printing plate and the first ink.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention and, together with the general description given above and the detailed description of the embodiments given below, serve to explain the principles of the invention.

DETAILED DESCRIPTION OF THE INVENTION

Now, the present invention will be described in detail by referring to the accompanying drawings that illustrate preferred embodiments of the invention.

1st EMBODIMENT

Figure 8:
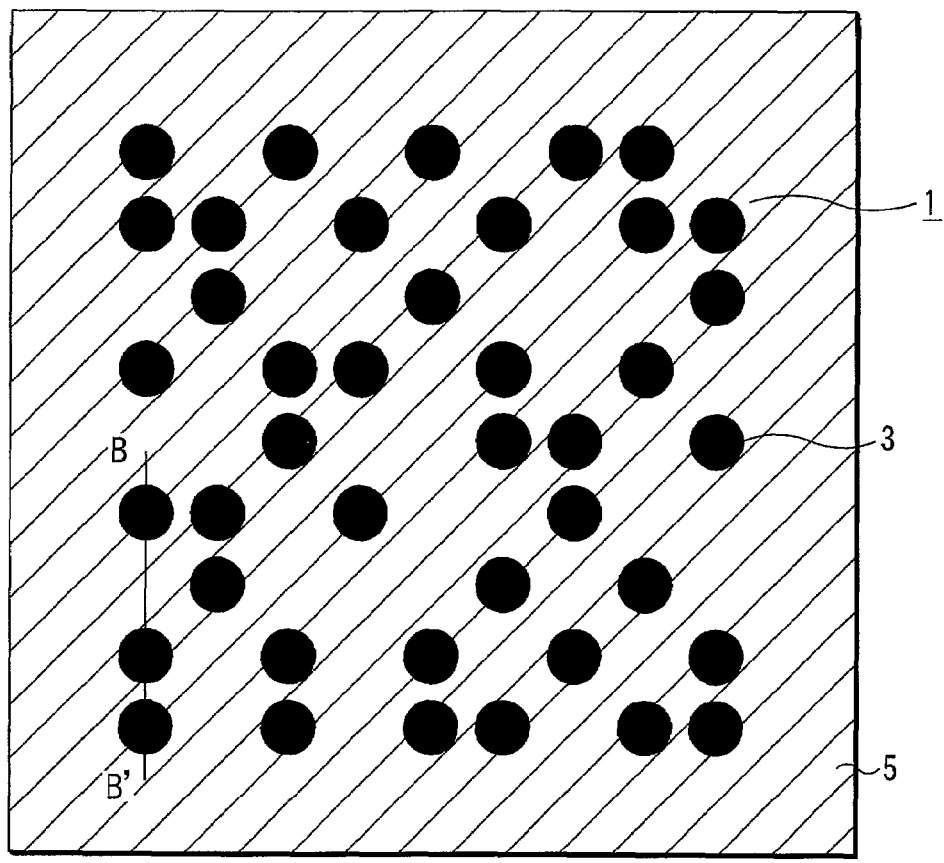
FIG. 8 is a schematic illustration of a dot code printed by the first embodiment of printing method according to the invention.

FIG. 8 schematically illustrates an optically readable dot code 1 printed on a sheet of paper (not shown) by the first embodiment of a printing method according to the invention. As will be described hereinafter, the dots 3 of the dot code 1 are printed by the first printing unit, using the first printing plate and the first ink. Additionally, a code coat 5 is formed to cover the dot code 1 in the second processing step that comes immediately after the first processing step, using the second processing plate and the second ink having the property of not affecting the readability of the code.

Figure 9:
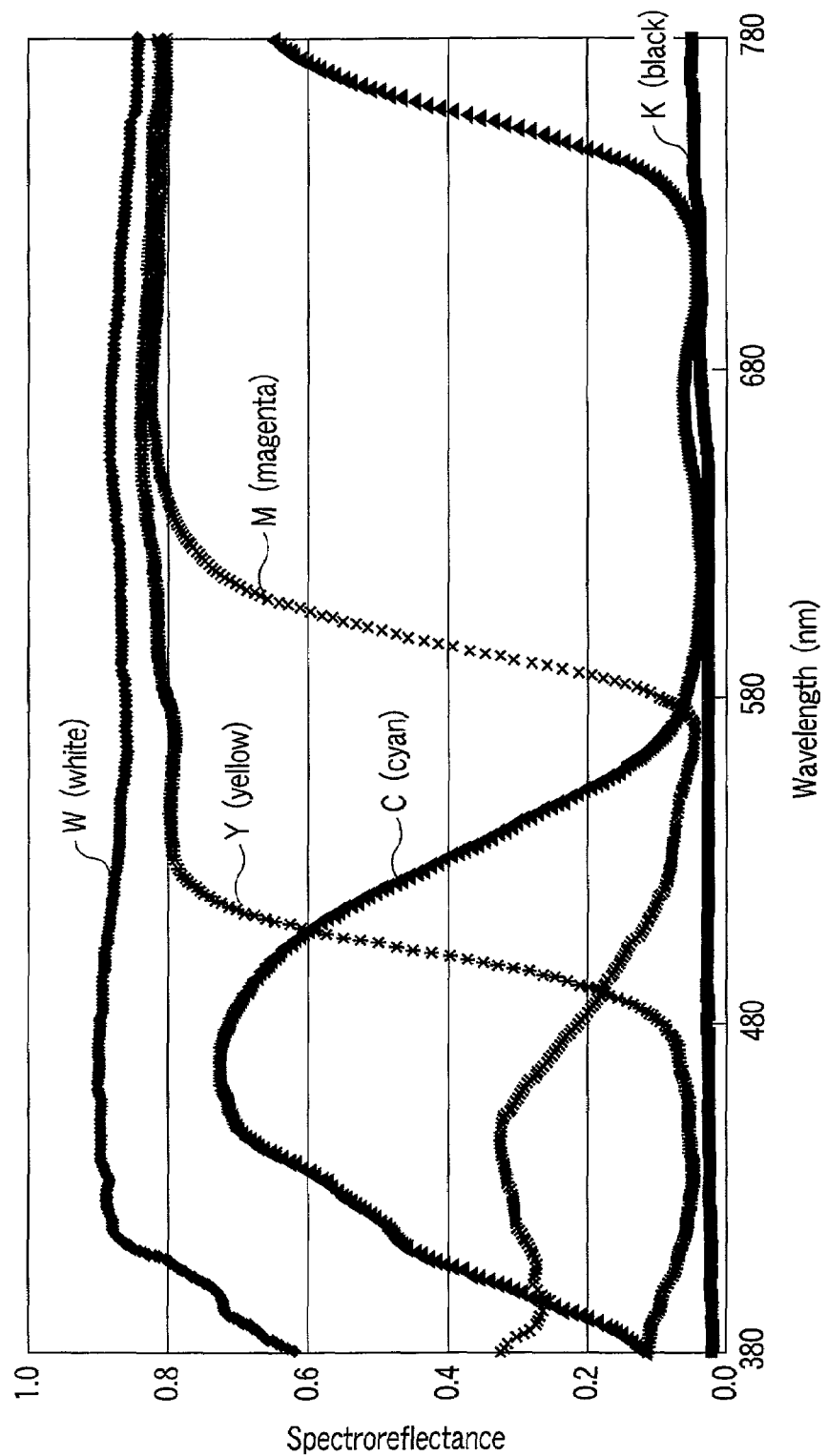
FIG. 9 is a graph schematically illustrating the spectroreflectances of white, black, cyan, magenta and yellow inks.

Now, the first ink and the second ink will be described here. The first ink is required to have a property of absorbing light from the lighting section of the reading device whereas the second ink is required to have a property of reflecting light from the lighting section of the reading device. This will be described in greater detail by referring to FIG. 9 showing the spectroreflectance of the each of the inks. Assume here that the light source of the optical reading device emits red light (with a wavelength of 680 nm). When the light source emits light with a wavelength of 680 nm, black ink K or cyan ink C that shows a low spectroreflectance to light with that wavelength and hence absorbs light with the wavelength may be used for the dot code. On the other hand, white ink W, yellow ink Y or magenta ink M that shows a high spectroreflectance to light with the wavelength of 680 nm may be used for the background.

Figure 10:
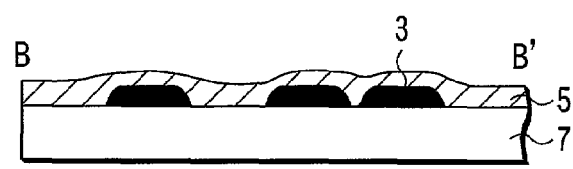
FIG. 10 is a schematic cross sectional view of the printed dot code of FIG. 8 taken along line B-B' in FIG. 8.

FIG. 10 is a cross sectional view taken along line B-B' in FIG. 8. The dots 3 are printed on a sheet of paper 7 and the code coat 5 is formed to cover the dots 3. While the ink layer of the code coat 5 is thin on the dots 3, the operation of reading the dot code 1 is not affected.

Figure 11:
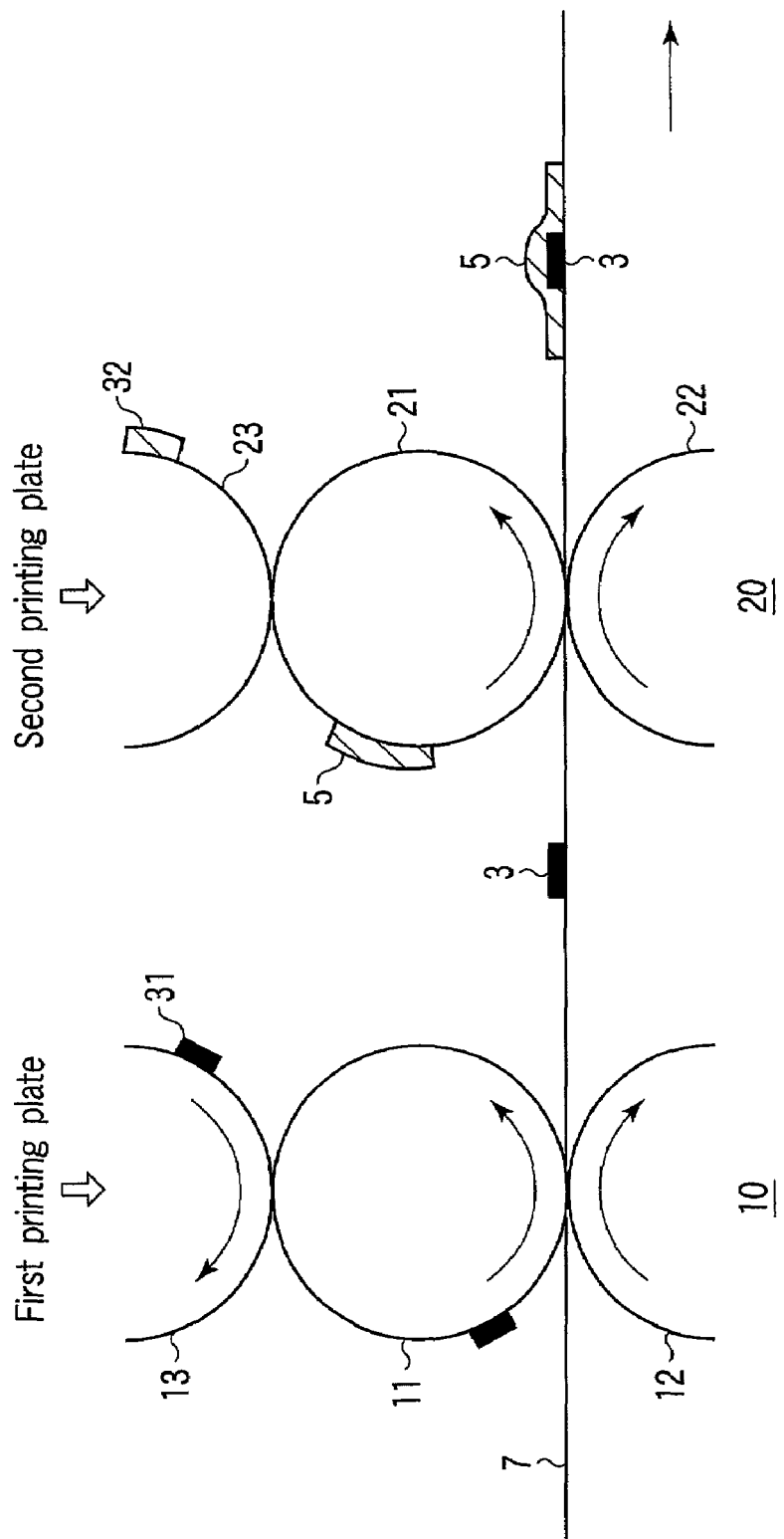
FIG. 11 is a schematic illustration of the first embodiment of printing method according to the invention.

FIG. 11 is a schematic illustration of this embodiment of a printing method according to the invention. It shows only the first printing unit 10 and the second printing unit 20 of the plurality of processing units and the remaining printing units are omitted from it for the purpose of simplicity. The first printing unit 10 comprises a blanket cylinder 11, an impression cylinder 12 and a plate cylinder 13. Similarly, the second printing unit 20 comprises a blanket cylinder 21, an impression cylinder 22 and a plate cylinder 23.

Figure 1:
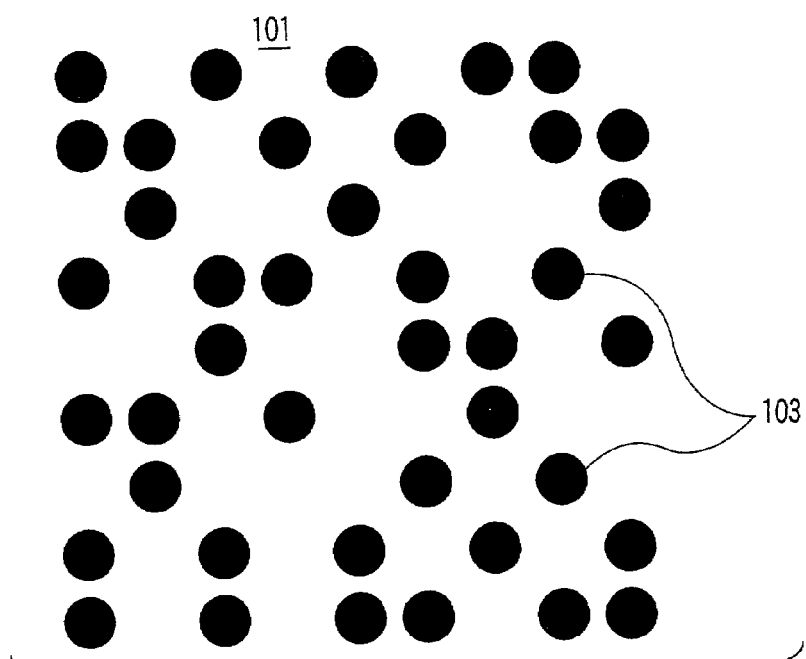
FIG. 1 is a schematic illustration of a dot code printed on a recording medium that is a sheet of paper.
Figure 2:
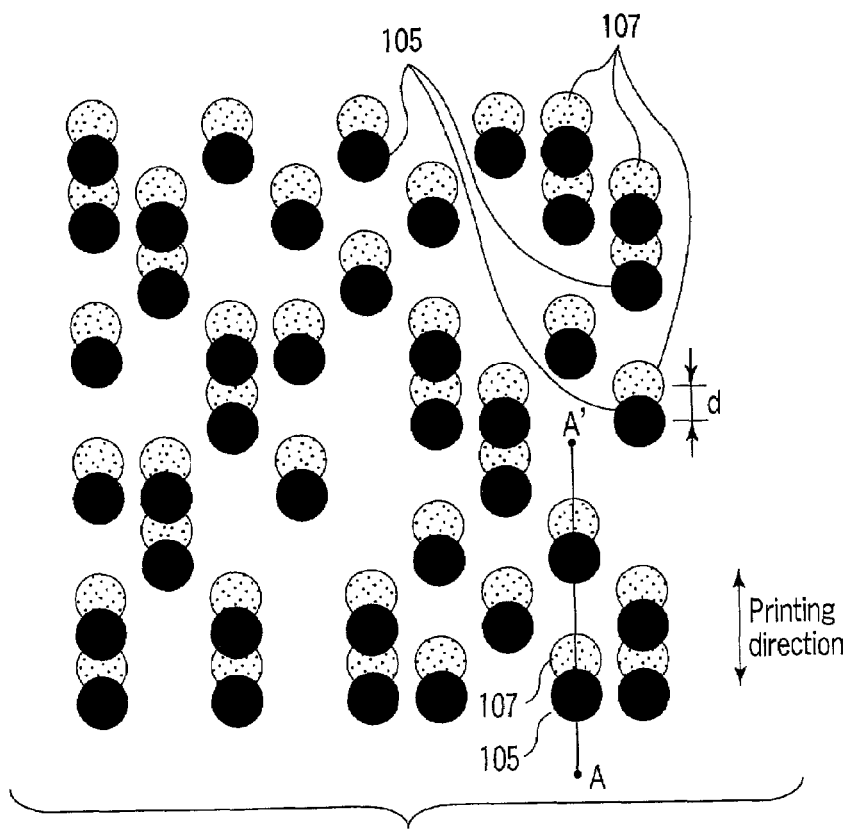
FIG. 2 is a schematic illustration of a dot code in an offset doubling.
Figure 3:
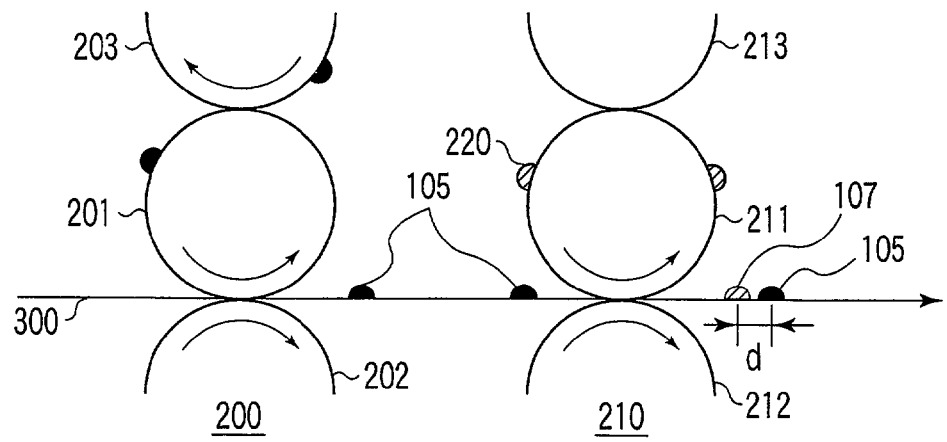
FIG. 3 is a schematic illustration of how an offset doubling is produced.
Figure 4:
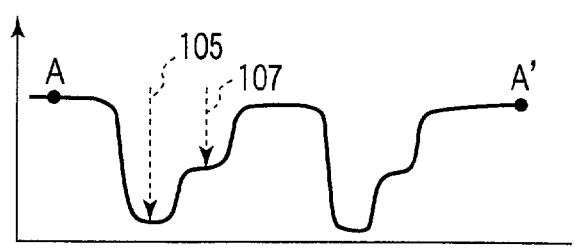
FIG. 4 is a schematic illustration of the density distribution of the offset doubling of FIG. 2 as viewed in cross section taken along line A-A' in FIG. 2.
Figures 5, 6, 7:
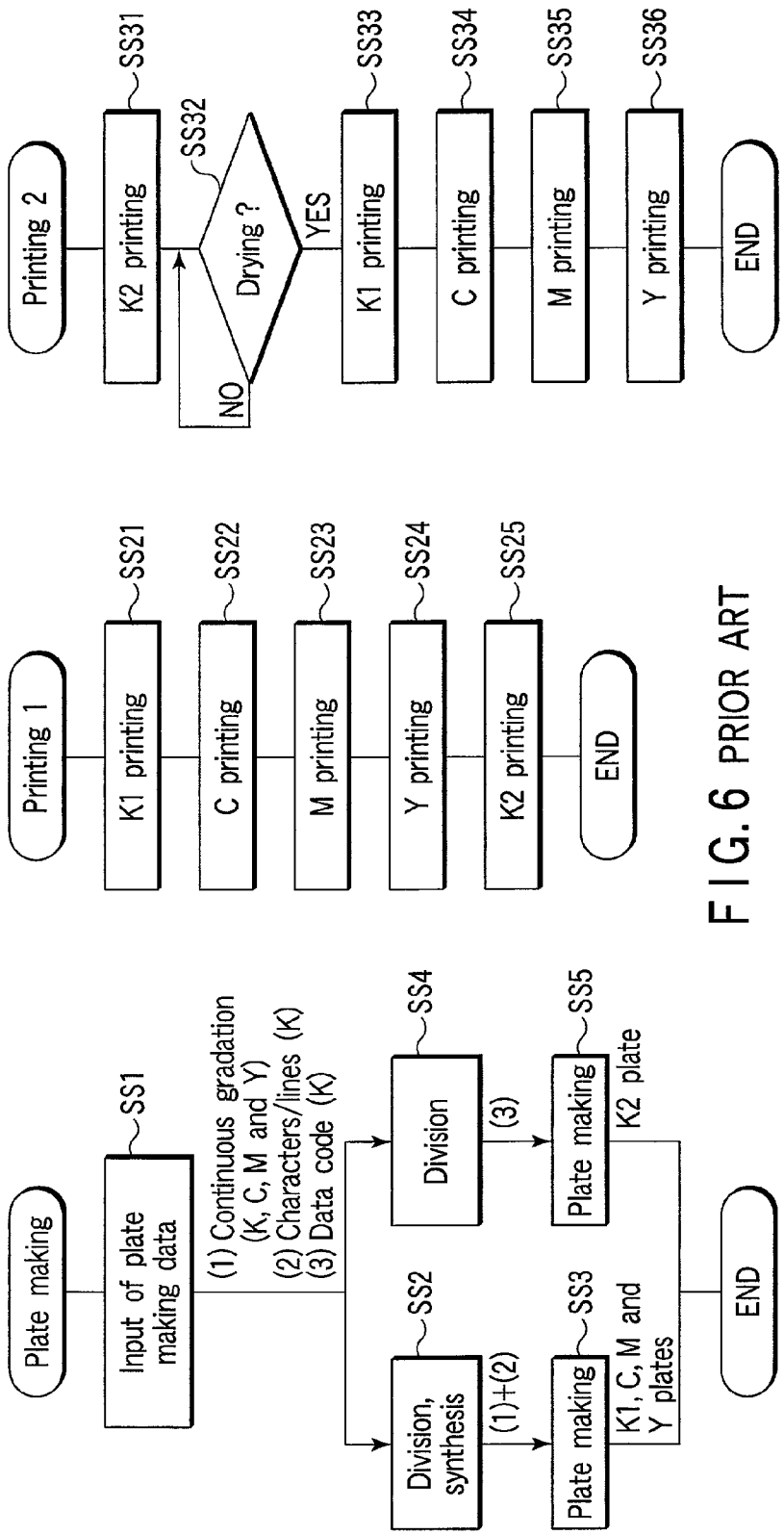
FIG. 5 is a flow chart of the plate making process of a known printing method.
FIG. 6 is a flow chart of the printing process of a known printing method.
FIG. 7 is a flow chart of the printing process obtained by modifying that of FIG. 6.

The dot code 1 is (dots 3 are) printed on the sheet of paper 7 in the first printing unit 10, using the first printing plate and the first ink. Immediately thereafter, the code coat 5 is printed in the second printing unit 20, using the second printing plate and the second ink 32. Since the code coat 5 is formed over a large area to cover the dot code 1, the printed dot code 1 (dots 3) will never be brought into direct contact with the blanket cylinder 21 in the second printing unit 20. Therefore, unlike the case described earlier by referring to FIG. 3, the blanket cylinder 21 will never reversely trap the first ink and hence any offset doubling can be prevented from taking place.

Figure 12:
FIG. 12 is a schematic illustration of the cylinder plates and the printing sequence of inks of the first embodiment of printing method of the invention to be used with a general purpose printing machine.
Figure 12:

FIG. 12 schematically illustrates the sequence of arrangement of the cylinder plates and inks in a general purpose printing machine that can be used with this embodiment of a printing method according to the invention.

In ordinary four color printing, inks are sequentially used in the order of K→C→M→Y. However, with this embodiment, the order needs to be changed. Since black ink (K) or cyan ink (C) can be used for dot codes with this embodiment, yellow ink (Y) or magenta ink (M) can be used for the code coat 5 to provide the four possible combinations of inks (1) through (4) as shown in FIG. 12. Note that, in FIG. 12, ○ denotes the ink used for printing the dot code 1 and □ denotes the ink used for printing the code coat 5.

Referring to FIG. 12, (1) shows the use of black ink at the first cylinder for printing the dot code 1 (dots 3) and the use of yellow ink at the second cylinder for printing the code coat 5. The plate for black ink and the plate for yellow ink may be arranged respectively on the second and third cylinders or the third and fourth cylinders because they only need to be arranged in such a way that the latter comes immediately after the former. If the third and fourth cylinders are used, the sequence of the use of the inks is expressed by C→M→K→Y.

In FIG. 12, (2) shows the use of black ink at the first cylinder for printing the dot code 1 (dots 3) and the use of magenta ink at the second cylinder for printing the code coat 5.

Similarly, (3) shows the use of cyan ink at the second cylinder for printing the dot code 1 (dots 3) and the use of magenta ink at the third cylinder for printing the code coat 5.

Likewise, (4) shows the use of cyan ink at the second cylinder for printing the dot code 1 (dots 3) and the use of yellow ink at the third cylinder for printing the code coat 5.

Figure 13:
FIG. 13 is a schematic illustration of the printing sequence obtained by modifying that of FIG. 12.
Figure 13:

FIG. 13 is a schematic illustration of the printing sequence obtained by modifying that of FIG. 12 and adapted to print a mixture of characters, photo-graphic images and codes in black. More specifically, a K1 plate is used for other than the dot code 1, or for characters and images, and a K2 plate is used for the dot code 1. Therefore, a five color printing machine has to be used with this modified arrangement. With this modified arrangement, it is necessary to optimally regulate the rate of ink supply independently for the K1 plate for printing characters and images and for the K2 plate for printing the dot code 1.

In FIG. 13, (5) shows the use of black ink at the fourth cylinder for printing the dot code 1 (dots 3) and the use of yellow ink at the fifth cylinder for printing the code coat 5. The plate for black ink and the plate for yellow ink may be arranged respectively on the second and third cylinders or the third and fourth cylinders because they only need to be arranged in such a way that the latter comes immediately after the former.

Also in FIG. 13, (6) shows the use of black ink at the fourth cylinder for printing the dot code 1 (dots 3) and the use of magenta ink at the fifth cylinder for printing the code coat 5.

Similarly, (7) shows the use of cyan ink at the fourth cylinder for printing the dot code 1 (dots 3) and the use of yellow ink at the fifth cylinder for printing the code coat 5.

Likewise, (8) shows the use of cyan ink at the fourth cylinder for printing the dot code 1 (dots 3) and the use of magenta ink at the fifth cylinder for printing the code coat 5.

In the case of (7) and (8) above, different plates may be used for C1 and C2 to replace the plate for C. Then, it is possible to optimally regulate the rate of ink supply independently for the C1 plate and for the C2 plate just like the above described instance of using K1 and K2 plates.

The use of the plate for dot code 1 as separated from the plate for characters and photographic images can effectively suppress possible variances in the size of the dots 3 of the dot code 1. However, if the reading device shows a wide margin for reading dots whose size can vary considerably, it will not be necessary to use a separate plate for the dot code 1.

While an ordinary printing operation is described above by referring to FIGS. 12 and 13, there may be occasions where the surface of the printed sheet of paper needs to be processed by using OP varnish (over print varnish). In the case of four color printing accompanied by an OP varnish process, a five color printing machine is used and the OP varnish process is conducted at the last plate. In other words, the printing sequence of the five color printing machine will be C→M→K→Y→OP. Likewise, in the case of five color printing accompanied by an OP varnish process, a six color printing machine is used and the OP varnish process is conducted at the last plate. In other words, the printing sequence of the six color printing machine will be K1→C→NM→K2→Y→OP.

It will be appreciated that the background of the dot code 1 can be printed by using the plate for M ink before printing the dot code 1 by using the plate for it when the above described printing sequence of C→M→K→Y or K1→C→M→K2→Y→OP is selected. More specifically, the magenta color can be used for the background of the dot code 1 by printing the background in halftone dots with an areal ratio smaller than a predetermined value. As described earlier, the ink layer of the code coat 5 will be thin on the dots 3 when the code coat 5 is formed solidly and immediately after printing the dot code 1 and the reading device may have difficulty in reading the dot code 1. However, the inventor of the present invention has found as a result of experiments that the dot code 1 can be read without problem if the code coat 5 is formed immediately after printing the dot code 1 when the areal ratio of the halftone dots of M ink is smaller than a predetermined value.

2nd EMBODIMENT

Transparent ink that is transparent relative to visible light with a wavelength range between 380 and 780 nm may be used for the code coat 5.

Figure 14:
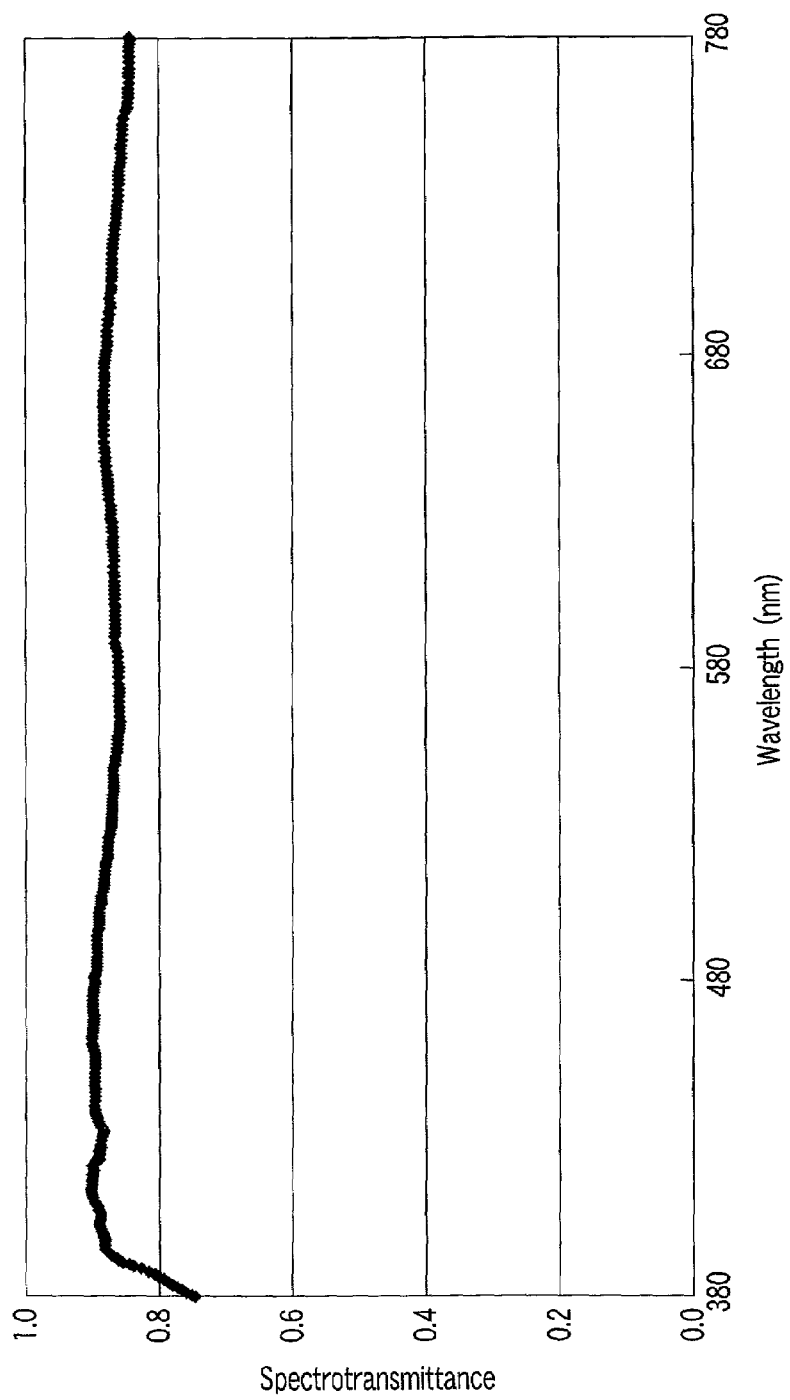
FIG. 14 is a graph schematically illustrating the spectrotransmittance of transparent ink that can be used with the second embodiment of printing method according to the invention.

FIG. 14 is a graph illustrating the spectrotransmittance of such transparent ink.

Light emitted from the light source of the reading device is transmitted through the code coat 5 formed by transparent ink and reflected by the white area of the sheet of paper (area other than the dots) so that the use of such ink provide an effect the same as that of ink adapted to reflect light.

3rd EMBODIMENT

While the light source of the reading device emits red light and the dot code of the printed matter is printed in black or cyan in the above description, the light source of the reading device may alternatively emit light of some other color, for example blue light.

Referring to FIG. 9, if the light source comprises an LED adapted to emit blue light with a wavelength of 450 nm, the dot code of the printed matter may be printed by using black ink (K) or yellow ink (Y) that absorbs blue light.

Since the ordinary color printing sequence is K→C→M→Y, the dot code 1 can be printed by using the last cylinder when yellow ink is used for it.

With this arrangement, the operation of printing the code coat 5 is not required to come immediately after that of printing the dot code 1, so that the problem of producing offset doublings can be effectively avoided to make it possible to provide high quality dot codes 1 on a stable basis.

Additionally, with this arrangement, it is not necessary to alter the ordinary printing sequence and hence there will be no risk of damaging the quality of the printed images.

Still additionally, since a dot code printed in yellow draws less attention than a dot code printed in black, it provides an effect close to that of stealthy ink (invisible ink).

The LED adapted to emit blue light may be replaced by a light source for emitting white light when the reading part of the reading device is provided with a blue filter.

As described above, this embodiment is in fact a multi-color printing method for sequentially using n (n=an integer) printing plates for inks of n different colors, the last printing plate being adapted to print an optically readable dot code, using yellow ink, on a printing medium.

While the present invention is described above by referring to preferred embodiments, the present invention is by no means limited thereto and the embodiments can be modified or altered without departing from the scope of the invention.

For example, the present invention is not limited to printing dot codes of the type as disclosed in U.S. Pat. No. 5,896,403 and is applicable to printing optically readable codes of any other types.

The present invention will be summarized below.

(1) A printing method for printing an optically readable dot code on a printing medium by means of printing plates, the method comprising:

a first step of printing the code on the printing medium, using a first printing plate and a first ink; and a second step of forming a code coat covering the code on the printing medium by printing, using a second printing plate and a second ink having a property of not affecting the operation of reading the code.

This aspect of a printing method corresponds to the first embodiment as described above by referring to FIGS. 8 through 13.

This printing method is adapted to print an optically readable code on a printing medium, using printing plates like those of offset printing. The code is printed on the printing medium in the first printing step by using the first printing plate and the first ink. Then, the code coat is formed by printing, using the second printing plate and the second ink having a property of not affecting the operation of reading the code in the second printing step that comes immediately after the first printing step. Since the code coat is formed over a range much greater than the area of the code to cover the latter, the first ink used for printing the code on the sheet of paper in the fist printing step is not brought into direct contact with the blanket cylinder in the second printing step. Therefore, the ink used for printing the code will not, if partly, be transferred to (and reversely trapped by) the blanket cylinder of the second printing step. In other words, the risk of producing an offset doubling can be prevented because no ink will be reversely trapped by the blanket cylinder. If ink having a property of not affecting the operation of reading the code is used for the second ink, the code can be read without problem if a color other than white is used for the background of the code.

(2) The method according to (1), wherein the first ink has a property of absorbing light irradiating the code and coming from a lighting section of a reading device for optically reading the code; and the second ink has a property of reflecting light coming from the lighting section.

This aspect of a printing method also corresponds to the first embodiment as described above by referring to FIGS. 8 through 13.

Since the first ink has a property of absorbing light irradiating the code and coming from the lighting section of the reading device and the second ink has a property of reflecting light coming from the lighting section, the reading device can reliably determine the presence or absence of a dot in a specific position of the code. The color of the code and that of the background can be selected appropriately depending on the wavelength of light emitted from the light source of the lighting section of the reading device.

(3) The method according to (2), wherein,
if light coming from the lighting section is red light,
the first ink is anyone of black ink and cyan ink; and
the second ink is anyone of magenta ink and yellow ink.

This aspect of a printing method also corresponds to the first embodiment as described above by referring to FIGS. 8 through 13.

Black or cyan ink absorbs red light, whereas magenta or yellow ink reflect red light. Therefore, the reading device can read the code without problem when the code is printed in black or cyan while the background is printed in magenta or yellow. Since black ink, cyan ink, magenta ink and yellow ink are marketed as ordinary process inks, the use of such inks can reduce the printing cost.

(4) The method according to (1), wherein
the second ink has a property of being transparent relative to visible light.

This aspect of a printing method corresponds to the second embodiment as described above by referring to FIG. 14.

Since the second ink has a property of being transparent relative to visible light, the reading operation of the reading device is not affected by the transparent ink and hence the reading device can reliably determine the presence or absence of a dot in a specific position of the code.

(5) A printed matter bearing an optically readable printed code, the printed matter comprising:
the code printed by using a first printing plate and a first ink; and
a code coat formed by printing to cover the code immediately after the operation of printing the code, using a second printing plate and a second ink having a property of not adversely affecting the operation of reading the code, the second printing plate and the second ink being different respectively from the first printing plate and the first ink.

This aspect of a printed matter corresponds to the first embodiment as described above by referring to FIGS. 8 through 13.

A printed matter according to the invention bears an optically readable code printed on a printing medium by means of a printing method using printing plates such as those of offset printing. A printing method for producing such a printed matter typically comprises a first printing step for printing the code on the printing medium, using the first printing plate and the first ink and second printing step for printing a code coat covering the code, using the second printing plate and the second ink having a property of not adversely affecting the operation of reading the code. Since the code coat is formed over a range much greater than the area of the code to cover the latter, the first ink used for printing the code on the sheet of paper in the fist printing step is not brought into direct contact with the blanket cylinder in the second printing step. Therefore, the ink used for printing the code will not, if partly transferred to (and reversely trapped by) the blanket cylinder of the second printing step. In other words, the risk of producing an offset doubling can be prevented because no ink will be reversely trapped by the blanket cylinder. If ink having a property of not affecting the operation of reading the code is used for the second ink, the code can be read without problem if a color other than white is used for the background of the code.

Additional advantages and modifications will readily occur to those skilled in the art. Therefore, the invention in its broader aspect is not limited to the specific details, representative devices and illustrated examples shown and described herein. Accordingly, various modifications may be made without departing from the spirit or scope of the general inventive concept as defined by the appended claims and their equivalents.

What is claimed is:

1. A printing method for printing an optically readable dot code on a printing medium with printing plates, said method comprising:
   a first step of printing said code on said printing medium, using a first printing plate and a first ink; and
   a second step, performed immediately after the first step, of forming an ink code coat completely covering said code on said printing medium by printing, using a second printing plate and a second ink having a property of not affecting the operation of reading said code.

2. The method according to claim 1, wherein
said first ink has a property of absorbing light irradiating said code and coming from a lighting section of a reading device for optically reading said code; and
said second ink has a property of reflecting light coming from said lighting section.

3. The method according to claim 2, wherein, if the light coming from said lighting section is red light, said first ink is one of black ink and cyan ink, and said second ink is one of magenta ink and yellow ink.

4. The method according to claim 1, wherein said second ink has a property of being transparent relative to visible light.

5. A printing method for printing an optically readable dot code on a printing medium with printing plates, said method comprising:
   a first step of printing said code on said printing medium, using a first printing plate and a first ink; and
   a second step, performed immediately after the first step, of forming an ink code coat completely covering said code on said printing medium by printing, using a second printing plate and a second ink having a property of not affecting the operation of reading said code, the second ink over an area larger than an area of said code.

* * * * *